United States Patent
Ichikawa et al.

(10) Patent No.: US 7,462,229 B2
(45) Date of Patent: Dec. 9, 2008

(54) OIL-BASED INK COMPOSITION FOR BALLPOINT PEN USING OIL-BASED INK

(75) Inventors: Shuji Ichikawa, Yokohama (JP); Miyuki Shoji, Tokyo (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 186 days.

(21) Appl. No.: 10/528,404

(22) PCT Filed: Sep. 19, 2003

(86) PCT No.: PCT/JP03/12033

§ 371 (c)(1),
(2), (4) Date: Apr. 14, 2005

(87) PCT Pub. No.: WO2004/026979

PCT Pub. Date: Apr. 1, 2004

(65) Prior Publication Data
US 2006/0117996 A1    Jun. 8, 2006

(30) Foreign Application Priority Data
Sep. 20, 2002 (JP) ............... 2002-275736
Sep. 20, 2002 (JP) ............... 2002-275812
Sep. 20, 2002 (JP) ............... 2002-275834

(51) Int. Cl.
*C09D 11/00* (2006.01)

(52) U.S. Cl. ............. 106/31.58; 106/31.59; 106/31.86; 106/31.89

(58) Field of Classification Search ............. 106/31.59, 106/31.58, 31.89, 31.86
See application file for complete search history.

(56) References Cited

U.S. PATENT DOCUMENTS

| | | | |
|---|---|---|---|
| 5,980,624 A | 11/1999 | Ichikawa | |
| 6,004,388 A * | 12/1999 | Osada | 106/31.57 |
| 6,423,127 B1 * | 7/2002 | Miyamoto et al. | 106/31.58 |
| 6,786,956 B2 * | 9/2004 | Ichikawa | 106/31.43 |
| 2004/0207702 A1 * | 10/2004 | Ikeda et al. | 347/100 |

FOREIGN PATENT DOCUMENTS

| | | |
|---|---|---|
| JP | 57-38629 | 8/1982 |
| JP | 61-52872 | 11/1986 |
| JP | 3-28279 | 2/1991 |
| JP | 3-168254 | 7/1991 |
| JP | 6-247093 | 9/1994 |
| JP | 8-209054 | 8/1996 |
| JP | 11-21495 | 1/1999 |
| JP | 11-158421 | 6/1999 |

(Continued)

*Primary Examiner*—Jerry Lorengo
*Assistant Examiner*—Veronica Faison Gee
(74) *Attorney, Agent, or Firm*—Foley & Lardner LLP (57) ABSTRACT

Oil-based ink composition for a ballpoint pen, involving at least a coloring material, a resin and a solvent selected from the group consisting of an alcohol, a polyhydric alcohol and a glycol ether each having a vapor pressure of 0.001 mmHg or more at 25° C. as a main solvent and further involving a phosphoric acid ester neutralized material; in order to provide an ink composition for a ballpoint pen which suppresses blobbing of a written letter at the start of writing and is capable of being excellent in a soft smooth feeling on writing.

5 Claims, 1 Drawing Sheet

FOREIGN PATENT DOCUMENTS

| | | |
|---|---|---|
| JP | 2001-192599 | 7/2001 |
| JP | 2002-12806 | 1/2002 |
| JP | 2002-60669 | 2/2002 |
| JP | 2002-97401 | 4/2002 |
| JP | 2002-201398 | 7/2002 |

* cited by examiner

Fig.1

OIL-BASED INK COMPOSITION FOR BALLPOINT PEN USING OIL-BASED INK

This application is a National Stage application of PCT/JP2003/012033, filed Sep. 19, 2003, which claims priority from Japanese patent applications 2002-275736, 2002-275812 and 2002-275834, all filed Sep. 20, 2002. The entire contents of each of the aforementioned applications are incorporated herein by reference.

TECHNICAL FIELD OF THE INVENTION

The present invention relates to an oil-based ink composition for a ballpoint pen which is suitably used as an oil-based ink for the ballpoint pen and is excellent in suppressing blobbing of written letters at the start of writing, provides a soft smooth feeling of writing and, further, allows the ink to be quickly transferred.

BACKGROUND ART

Heretofore, in an oil-based ballpoint pen, a drawback is liable to occur in which, when a solvent of an ink at a tip end portion of a ball tip is evaporated and, then, the ink becomes thickened, the ink is not easily ejected at the start of writing to cause blobbing of written letters, or a written letter with a sufficient density cannot be obtained until the ball starts fully rotating. Further, this blobbing phenomenon greatly depends on environmental conditions and often occurs under low-temperature or high-temperature conditions to cause distress. Still further, in a case of using a solvent having a high volatility, as defined in the Claims, this phenomenon occurs outstandingly and becomes a serious problem. In order to solve these problems, various efforts have heretofore been exerted. For example, in an invention according to Japanese Examined Patent Publication (Kokoku) No. 61-52872, the invention in which fluidity of an ink is maintained by adding a specific nonionic surfactant is described; in Japanese Examined Patent Publication (Kokoku) No. 57-38629, an invention of using a high boiling point aromatic hydrocarbon as a solvent for suppressing deterioration of an ink to be caused by drying or by absorbing moisture is described; in an invention according to Japanese Unexamined Patent Publication (Kokai) No. 3-28279, fluidity of an ink is maintained by adding a phosphoric acid ester; in an invention according to Japanese Unexamined Patent Publication (Kokai) No. 6-247093, an ink is prevented from being completely dried out by using a nonvolatile solvent.

In an invention according to Japanese Unexamined Patent Publication (Kokai) No. 11-158421, by compounding a salt of a basic dye with a phosphoric acid ester, crystallization of a dye at a pen tip is suppressed and the ink is allowed to be in a state of from a grease to a paste such that the ink is hard to dry-solidify at a tip end portion of a pen, whereby the fluidity of an ink is maintained and, as a result, smooth writing at the start of writing is secured, to thereby improve the problematic blobbing phenomenon. Also, in an invention according to Japanese Unexamined Patent Publication (Kokai) No. 11-21495, the same effect as described above is generated by neutralizing an acidic polyoxyethylene alkyl ether phosphoric acid ester with a predetermined alkyl alkanolamine or morpholine. However, the amine substance used on this occasion has a strong odor and high reactivity and, therefore, a degree of freedom of selection of solvents, dyes and the like is narrow. Further, there is no measure for determining a stable neutralized material.

However, although there scarcely arises a problem in a solvent having such a vapor pressure of less than 0.01 mmHg as used in a conventional oil-based ballpoint pen, in the case of using a solvent having a high vapor pressure, when an ink agglomerate is solidified in a periphery of a ball, an extremely high writing load is required to start writing in which the ball moves.

An object of the present invention is to provide an oil-based ink composition for a ballpoint pen which, unlike conventional techniques, suppresses blobbing of a written letter at the start of writing and is excellent in soft smooth writing at the start of writing, and a ballpoint pen using the ink composition.

DISCLOSURE OF THE INVENTION

In order to attain the aforementioned object, it has been found that the above-described problems can be solved by giving an oil-based ink composition, for a ballpoint pen according to the present invention, the characteristics as described below, to thereby accomplish the present invention.

[1] An oil-based ink composition for a ballpoint pen, comprising at least a coloring material, a resin and a solvent selected from the group consisting of an alcohol, a polyhydric alcohol and a glycol ether each having a vapor pressure of 0.001 mmHg or more at 25° C. as a main solvent which occupies 50% or more of an entire solvent and, further, satisfying at least one of the following (a) to (c):

(a) further comprising a phosphoric acid ester neutralized material and polypropylene glycol;

(b) further comprising a chemical substance represented by the following chemical structure (1) or (2):

in which R represents an alkyl group having from 10 to 30 carbon atoms or in which R represents an alkyl group having from 10 to 30 carbon atoms; and (c) comprising a solvent selected as the main solvent from the group consisting of an alcohol, a polyhydric alcohol and a glycol ether each having no aromatic ring in a molecular structure in an amount of 50% by weight or more of an entire solvent, further comprising a phosphoric acid ester neutralized mixture and, still further comprising an additional solvent selected from the group consisting of an alcohol, a polyhydric alcohol and a glycol ether each having an aromatic ring in an amount, based on an entire weight of the ink composition, of from 0.1 to 15% by weight.

[2] The oil-based ink composition for the ballpoint pen according to the above-described [1], in which the glycol ether is a solvent represented by the following chemical structure (3):

(3)

in which R¹, R² and R³ each independently represent H or CH₃.

[3] The oil-based ink composition for the ballpoint pen according to the above-described [1] or [2], in which the glycol ether is at least one type selected from the group consisting of: propylene glycol monomethyl ether, 1,3-butanediol, 3-methoxy-1-butanol and 3-methyl-3-methoxy-1-butanol.

[4] The oil-based ink composition for the ballpoint pen according to the above-described [1] to [3], wherein the main solvent is contained in an amount, based on an entire solvent, of 60% by weight or more.

[5] The oil-based ink composition for the ballpoint pen according to the above-described [1] to [4], wherein the main solvent is contained in an amount, based on an entire solvent, of 70% by weight or more.

[6] The oil-based ink composition for the ballpoint pen according to any one of the above-described [1] to [5], wherein the phosphoric acid ester neutralized material is contained in an amount, based on an entire weight of the ink composition, of from 0.01 to 15% by weight.

[7] The oil-based ink composition for the ballpoint pen according to the above-described [1] to [6], in which polypropylene glycol has a molecular weight of 1,000 or more and is added in an amount of 0.01% by weight to 10% by weight.

[8] The oil-based ink composition for the ballpoint pen according to the above described [1] to [7], in which the coloring material is a pigment, or a pigment and a dye in combination.

[9] The oil-based ink composition for the ballpoint pen according to the above-described [1] to [8], in which an amount of the chemical substance represented by the chemical structure (1) or (2) to be added is, based on the ink composition, from 0.5% by weight to 10% by weight.

[10] The oil-based ink composition for the ballpoint pen according to the above-described [9], further comprising a mixture of a phosphoric acid ester and an amine-type compound.

[11] An oil-based ballpoint pen, containing the oil-based ink composition according to the above-described [1] to [10] in a refill.

[12] The oil-based ballpoint pen according to the above-described [11], further containing an ink follower in a rear of the ink.

BRIEF DESCRIPTION OF THE DRAWING

In FIG. 1, a ballpoint pen tip 1 made of metal is connected with one end portion of an ink holding tube 2 made of a transparent plastic in a liquid-tight manner. Although the type of structure of the tip 1 varies depending on the occasion, a ball made of metal or ceramic is present at a tip end thereof, an ink 3 in an ink holding tube 2 passes through an inside of the tip 1 and is, then, subjected to writing by a ball at the tip end. A follower 4 is mounted in a rear of the ink 3 in the ink holding tube 2 and, as the ink 3 is reduced, the follower 4 follows the movement of a rear end portion of the ink 3. Such a refill as described above is contained in an outer shaft, to thereby prepare a ballpoint pen.

MODE FOR CARRYING OUT THE INVENTION

<Solvent>

Figure 1:
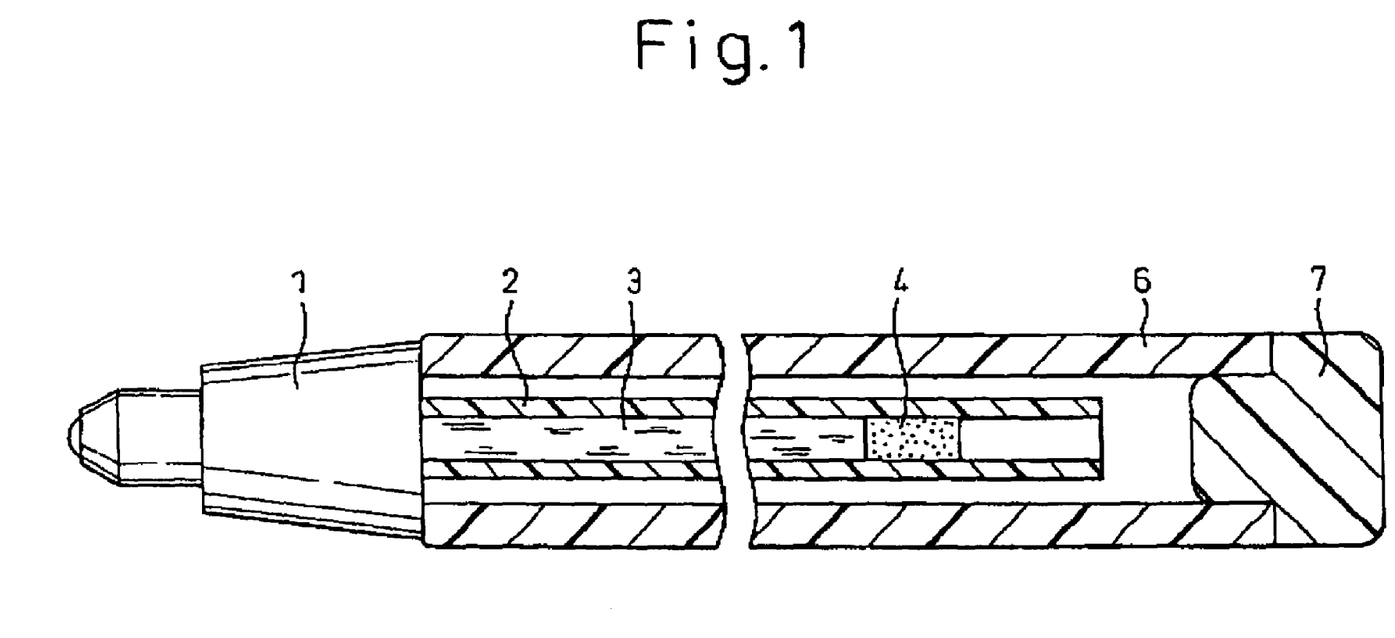
FIG. 1 is a cross-sectional diagram schematically showing a refill of an oil-based ballpoint pen.

As is apparent from the description of solvents to be made below, an oil-based ballpoint pen according to the present invention more accurately means as a non-aqueous ballpoint pen; however, as this type of pen is customarily called also as the oil-based ballpoint pen in the industry, it is called so in the present invention.

As for a main solvent (50% by weight or more of the entire solvent) to be used in a composition according to the present invention, a solvent selected from among an alcohol, a polyhydric alcohol and a glycol ether each having a vapor pressure of 0.001 mmHg or more at 25° C. is used. By using a specific solvent having such a high vapor pressure as described above, it becomes possible to provide the oil-based ballpoint pen which gives a smooth written letter and an excellent feeling on writing. An oil-based ink composition for a ballpoint pen according to the present invention has been developed to solve the problems unique to the case where a specific solvent having such a high vapor pressure as described above is used. The term "main solvent" as used herein is denoted as a solvent which is contained in an amount of 50% by weight or more of an entire solvent and may optionally be contained in an amount of 70% by weight or more or, further, 80% by weight or more or, particularly, 90% by weight or more.

Specific examples of the alcohols include aliphatic alcohols having 2 or more carbon atoms, such as ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methyl amyl alcohol, 2-ethyl butanol, n-heptanol, 2-heptanol, 3-heptanol, n-octanol, 2-octanol, 2-ethyl hexanol, 3,5,5-trimethyl hexanol, nonanol, n-decanol, undecanol, n-decanol, trimethylnonyl-alcohol, tetradecanol, heptadecanol, cyclohexanol, 2-methyl cyclohexanol, benzyl alcohol and other various types of higher alcohols than described above.

Also, specific examples of the polyhydric alcohols include polyhydric alcohols having 2 or more carbon atoms and 2 or more hydroxyl groups within the molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol.

Specific examples of the glycol ethers include methyl isopropyl ether, ethyl ether, ethyl propyl ether, ethyl butyl ether, isopropyl ether, butyl ether, hexyl ether, 2-ethyl hexyl ether, ethylene glycol monohexyl ether, ethylene glycol monophenyl ether, ethylene glycol mono-2-ethyl butyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

As for particularly preferable solvents, the solvents represented by the chemical structure (3) such as propylene glycol monomethyl ether, 1,3-butanediol, 3-methoxy-1-butanol and 3-methyl-3-methoxy-1-butanol are mentioned.

Among the solvent described above, particularly preferred are glycol ethers having from 2 to 7 carbon atoms because of their conspicuous effects. In view of safety, oral toxicity or the like, an organic solvent other than ethylene glycol derivatives is preferably used.

In addition to the above described solvents, a solvent shown below can also be added within the range of not hindering solubility of a mixture with a phosphoric acid ester and an amine-type compound or volatility.

Examples of such solvents include derivatives of polyhydric alcohols and, further, derivatives of a sorbitan fatty acid type, a polyglycerin higher fatty acid type, a sucrose fatty acid type and a propylene glycol fatty acid type.

As for solvents of esters, various types of esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, caprylic acid triglyceride, tributyl citric acetate, octyl oxystearate, propylene glycol monoricinolate, methyl 2-hydroxyisobutyrate and 3-methoxybutyl acetate are mentioned, Specific examples of diethers or diesters each as a solvent having no hydroxyl group within the molecule include ethylene glycol diethyl ether, ethylene glycol dibutyl ether, diethylene glycol diethyl ether, diethylene glycol dibutyl ether, diethylene glycol dimethyl ether and dipropylene glycol dimethyl ether.

<Coloring Material>

A coloring agent (coloring material) to be used in the oil-based ink for the ballpoint pen according to the present invention is not particularly limited and it is preferable to use a pigment or simultaneously use a pigment and a dye in combinations. By using the pigment, excellent fastness can be realized. As for such pigments, carbon black, organic pigments of a phthalocyanine type, azo types including insoluble azo types such as a monoazo, a disazo, a condensed azo and a chelate azo, soluble azo types such as a hard soluble azo and a soluble azo, a quinacridone type, a diketopyrrolopyrrole type, a threne type, a dioxazine type, and an isoindolinone type and the like can be used.

Particularly, as for carbon black, a carbon black having a specific surface area as small as possible is must be used and, on this occasion, that having a specific surface area of 100 m$^2$/g or less as a value measured by the BET method is preferred. Specifically, there are #33, #32, #30, #25, CF9 and the like of carbon black manufactured by Mitsubishi Chemical Co., Ltd.; REGAL (400R, 500R, 330R, and 300R), ELFTEX (8, and 12), STERLING R and the like of carbon black manufactured by Cabot Co., Ltd.; Printex (45, 40, 300, 30, 3, 35, 25, 200, A, and G), SB (250, and 200) and the like as being manufactured by Degussa AG.; and RAVEN (1040, 1035, 1020, 1000, 890, 890H, 850, 500, 450, 420, 410, H20, 22, 16, and 14) and the like as being manufactured by Columbian Chemicals Co.

Further, as for the pigments, a pigment which is hard to dissolve in an organic solvent and having an average particle diameter after dispersion of from 30 nm to 700 nm is preferred. An amount of the pigment to be compounded may be, based on the entire weight of the ink composition, in the range of from 0.5 to 25% by weight, preferably from 0.5 to 20% by weight. The pigment can be compounded in the above-described ranges in accordance with requirements.

The pigments which can be used in the present invention may be used each individually or in combinations of two or more thereof. If desired, a dispersion using an inorganic pigment, or a dye, or others may also be added within the range of not adversely affecting the dispersion stability. By using a dye, an excellent effect of color formation can be imparted. Further, other examples include resin emulsions obtained by polymerizing styrene, acrylic acid, an acrylic acid ester, methacrylic acid, a methacrylic acid ester, acrylonitrile or an olefin-base monomer; emulsions of hollow resins which swell in the ink to become amorphous; and organic multicolor pigments comprising dyed resin particles obtained by dyeing the above-described emulsion itself with a coloring material.

In a case in which the coloring material used in the present invention is a pigment, conventionally known various types of methods can be used to produce a pigment-dispersed ink composition. For example, respective components described above are compounded and stirred by a stirrer such as dissolver, or mixed and pulverized by a ball mill, a roll mill, a bead mill, a sand mill, a pin mill or the like and, then, the resultant mixture is centrifuged or filtered to remove coarse pigment particles, undissolved materials and mingled solids, to thereby easily prepare the pigment-dispersed ink composition.

The dyes as being used together with the pigments are not particularly limited and can be used so long as they do not destroy a dispersion system. As for dyes, any dye selected from among dyes used in normal dye ink compositions, such as a direct dye, an acid dye, a basic dye, a mordant/acidic mordant dye, a spirit-soluble dye, an azoic dye, a sulfur/sulfur vat dye, a vat dye, a dispersion dye, an oil-soluble dye, a food dye and a metal complex dye, and an inorganic pigment and an organic pigment used in normal pigment ink compositions can be used. An amount of the coloring material to be compounded may be, based on the entire amount of the composition, from 1 to 50% by weight.

<Resin>

A resin is used in the oil-based ink composition of the ballpoint pen according to the present invention. The resin for use in the oil-based ink composition for the ballpoint pen is added for the purpose of a viscosity adjustment or an abrasion improvement at a tip of the pen. When the pigment is contained, the resin is also used as a dispersing agent for the pigment. Examples of such resins include resins represented by a ketone resin, a styrene resin, a styrene-acrylic resin, a terpene phenol resin, a rosin-modified maleic acid resin, a rosin phenol resin, an alkylphenol resin, a phenol type resin, a styrene maleic acid resin, a rosin type resin, an acrylic resin, a urea aldehyde type resin, a maleic acid type resin, a cyclohexanone type resin, polyvinyl butyral and polyvinyl pyrrolidone.

An amount of any one of these resins to be compounded is preferably from 1 to 30% by weight, more preferably from 1 to 20%. When the amount to be compounded is less than 1%, there arises difficulty in the viscosity adjustment or the abrasion at the tip of the pen, while, when it exceeds 30% by weight, other starting materials than the resin may not be compounded or the feeling on writing is sometimes adversely affected.

In a case in which the pigment is used as the coloring material in the ink composition as a preferred embodiment according to the present invention, a resin capable of dispersing the pigment may be selected from among the above-described resins and used as the dispersant. The dispersant is not limited on the kind thereof and any one may be used, irrespective of activator or oligomer, insofar as it can satisfy the purpose. Specific examples of such dispersants include synthetic resins such as polyvinyl alcohol, polyvinyl pyrrolidone, polyvinyl butyral, polyvinyl ether, a styrene-maleic acid copolymer, a ketone resin, hydroxyethyl cellulose and derivatives thereof, and a styrene-acrylic acid copolymer, PO/EO adducts, and amine type oligomers of polyester.

Embodiment (a)

One embodiment (a) of the present invention is characterized by further comprising a phosphoric acid ester neutralized material and polypropylene glycol.

In this embodiment (a) of the present invention, the phosphoric acid ester neutralized material exerts an effect of facilitating removal of an ink agglomerate on a surface of a ball, to thereby exert an effect of suppressing a blobbing of a written letter at the start of writing, and exerts an effect of not only suppressing the blobbing of the written letter at the start of writing for a short period of time or a long period of time in cooperation with polypropylene glycol but also allowing an ink transfer at the time of writing at a low speed to be smoothly carried out.

The phosphoric acid ester to be used ordinarily comprises a phosphoric acid monoester, a diester and a trace amount of a triester. The ester structure thereof is mainly a surfactant structure, including an aromatic group type or an aliphatic group type. In regard to an alkyl group capable of forming a phosphoric acid ester structure, an alkyl group obtainable from a natural or synthetic higher alcohol or the like is introduced. Phosphoric acid esters having an alkyl group having from 10 to 20 carbon atoms and a chain having from 0 to 50 polyoxyethylene may be used. Particularly, a phosphoric acid ester having from 15 to 20 carbon atoms and a chain having from 0 to 4 polyoxyethylene is favorable.

Further, the phosphoric acid ester is used as a neutralized material and, on this occasion, it is desirable to neutralize the phosphoric acid ester with an amine type substance, particularly, an alkanol amine, polyoxyethylene alkylamine, an ampholytic surfactant, an aliphatic amine type substance or the like. Particularly, as for these amine type substances, a tertiary amine is favorably used. Further, as for the alkanol amine, such alkanol amine as having a vapor pressure of 1 mmHg or less at 20° C. is favorable. Specifically, N-methyl diethyl ethanolamine, N,N-dibutyl ethanolamine, N-n-butyl diethanolamine, N-t-butyl diethanolamine, N,N-diethyl isopropanolamine, triethanolamine and the like are mentioned.

An amount of any one of these amines to be added is, based on an entire ink composition, in the range of preferably from 0.01% by weight to 15% by weight, more preferably from 0.1 to 10% by weight and, particularly preferably, from 0.1 to 8% by weight in terms of a neutralized mixture. When it is less than 0.01% by weight, the effect of easily removing the agglomerate on the surface of the ball is reduced, while, when it exceeds 15% by weight, it may sometimes become easy to generate a problem in the quality of a drawn line in which the ink composition is too easily repelled from the ball to break the drawn line.

The ink composition for the oil-based ballpoint pen according to this embodiment (a) further comprises polypropylene glycol. The ink for the oil-based ballpoint pen which tends to be dry-solidified forms a film of the ink on the ball, for example, a metallic ball and such problem as described above is particularly conspicuous in a case of containing the pigment; however, when polypropylene glycol is added, as the film of the ink becomes hard to form, there is an effect of causing less blobbing at the start of writing. Such phenomenon as described above helps not only to suppress the blobbing by repelling of the ink against the metallic ball but it is also hard to form the ink film and, accordingly, it is possible to suppress the blobbing even in such a short period of time as from 1 to 20 minutes.

A molecular weight of the polypropylene glycol is preferably as large as possible because an amount thereof to be added can be small, to thereby enhance a drying property of the written line. The molecular weight (on a calculation basis) thereof is preferably 1000 or more, more preferably 2000 or more and, still more preferably, 4000 or more.

An amount of polypropylene glycol to be added is preferably from 0.01 to 10% by weight and, particularly preferably, 0.1 to 10% by weight. As the ink using the pigment which tends to be dry-solidified becomes hard to form a film on the metallic ball in the above-described ranges, the effect of less causing the blobbing at the start of writing is large.

When the amount to be added is less than 0.1% by weight which out of the above-described range, the above-described effect is poor and, then, the ball may sometimes stop rotating, while, when the amount exceeds 10% by weight, although depending on the raw material to be used, an amount of a nonvolatile component becomes high and, then, it may sometimes occur that a drying property of the written line is deteriorated or a strike-through thereof appears.

According to the embodiment (a) of the present invention, and different from a prior method, an ink composition for the ballpoint pen, in which the blobbing of the written letter at the start of writing for a short period of time or a long period of time is suppressed, to thereby enable an excellent soft smooth feeling on writing, is provided.

According to the embodiment (a) of the present invention, the reason for exerting such effects as described above is in the characteristics of the ink composition, namely, the ink having the pigment and volatility generates the ink agglomerate on the metallic ball. However, although polypropylene glycol to be used in this embodiment, particular that having a molecular weight of 1000 or more, acts against a pigment dispersion in a poor solvent manner, since it has capability of dissolving a resin or an affinity with the resin, it becomes difficult to form a hard ink agglomerate on the metallic ball. Accordingly, the blobbing or the like in the short period of time can be improved more than ever. Further, as polypropylene glycol having a molecular weight of 1000 or more becomes low in hydrogen bonding, the affinity to water becomes lower compared with that having a low molecular weight. From this fact, it gives little adverse effect (increase in hygroscopicity) to the hygroscopic main solvent within the scope of claims. Under these circumstances, it becomes possible to provide the oil-based ink composition for the ballpoint pen in which the blobbing at the start of writing is improved, to thereby provide excellent soft smooth feeling of writing.

Embodiment (b)

Another embodiment (b) of the present invention is characterized by comprising a chemical substance represented by the following chemical structure (1) or (2):

wherein R represents an alkyl group having from 10 to 30 carbon atoms; or wherein R represents an alkyl group having from 10 to 30 carbon atoms.

The chemical substance represented by the chemical structure (1) or (2) suppresses an increase of resistance, which is caused by components of an ink, in a contact portion between a ball and a ball seat in a chip and prevents hindrance of rotation of the ball, to thereby exert an effect of allowing the ink to be favorably transferred. Although this effect is unclear, it is conceivable that such an effect as lubrication is exerted by an interaction with ink raw materials, to the contact portion between the ball and the seat in the chip which hinders a continuous laminar ink injection, or a coating effect by these materials exhibits an action of such suppression as described above. Since abrasion is high, particularly in a case of the ink containing a pigment as a coloring material, this effect is remarkable and useful. The alkyl group in the chemical structure (1) or (2) preferably has from 10 to 30 carbon atoms. Particularly preferably, the alkyl group in the chemical structure (1) has from 10 to 20 carbon atoms and still more preferably has from 12 to 18 carbon atoms. Specifically, those chemical substances in a lauryl or stearyl form are put on the market; for example, ADEKA AMHOTE PB-30L (trade name) manufactured by ADEKA Co., Ltd., AMHITOL 86B (trade name) manufactured by Kao Corp., AM-301 (trade name) manufactured by Nikko Chemicals Co., Ltd., and BISTA-ML, -MS, etc. (trade name) manufactured by Matsumoto Yushi-Seiyaku Co., Ltd. are available in the market. Further, the same holds true with the alkyl group in the chemical structure (2); for example, AM-3130N (trade name) manufactured by Nikko Chemicals Co., Ltd., and BISTA-CAP (trade name) manufactured by Matsumoto Yushi-Seiyaku Co., Ltd. are available in the market.

An amount of the chemical substance represented by the chemical structure (1) or (2) to be added is, based on the ink composition, favorable in the range of from 0.5% by weight to 10% by weight. In the aforementioned range, even in the ink in which the pigment is used, an effect of favorably transferring the ink without hindering the rotation of the metallic ball is remarkable. When such addition amount exceeds 10% by weight, there is a fear of causing a problem in solubility or a problem in stability in a humid condition from the standpoint of the hygroscopic property and, accordingly, the addition amount is favorable in the range of from 0.5% by weight to 10% by weight. It is more desirable to reduce the addition amount as much as possible and, on this account, it is more favorably from 0.5 to 10% by weight and, still more favorably from 0.5 to 7.0% by weight.

In the embodiment (b), it is preferable to further use a mixture of the phosphoric acid ester and an amine-type compound. It is particularly preferable to use as a neutralized material between the phosphoric acid ester and the amine-type compound. This is because an effect of easily removing the ink agglomerate on a surface of the ball is provided and, then, not only the blobbing of the written letter at the start of writing is suppressed but also an effect of enhancing the effect of realizing the soft smooth feeling of writing by a high volatile solvent and quickly performing the transfer of the ink by addition of a chemical substance represented by the chemical structure (1) or (2) when writing is executed under a high load is exerted.

Specific examples, the addition amount and the like of the mixture of the phosphoric acid ester and the amine-type compound are same as those described for in the embodiment (a).

According to this embodiment (b) of the present invention, being different from a prior method, the ink composition for the ballpoint pen capable of being excellent in suppressing the blobbing of the written letter at the start of writing, realizing the soft smooth feeling of writing and quickly performing the transfer of the ink when writing is executed under the high load can be provided.

In this embodiment (b) of the present invention, the reason for exerting such effects as described above is in the characteristics of the ink composition. Although it is uncertain as to the reason why the ink is excellent in suppressing the blobbing at the start of writing, realizing the soft smooth feeling of writing and quickly performing the transfer of the ink when writing is executed under the high load can be obtained, it is due to using the chemical substance represented by the chemical structure (1) or (2) in an organic solvent-type ink, particularly, a pigment-containing ink. This is considered as being that the chemical substance represented by the chemical structure (1) or (2) which is hard to be present in an oil-based ink may control the solubility to the raw material at the interface between the metallic ball and the ink. It is considered that, by such control, abrasion is reduced or an abrasion coefficient is lowered and, then, a lubricating effect is executed. Under these circumstances, it has been possible to provide the oil-based ink composition for the ballpoint pen which improves the blobbing at the start of writing and is excellent in realizing the soft smooth feeling of writing and quickly performing the transfer of the ink when writing is executed under the high load.

Embodiment (c)

Another embodiment (c) of the present invention is characterized in that a solvent selected from among an alcohol, a polyhydric alcohol and a glycol ether each having no aromatic ring in the molecule as the main solvent occupies 50% by weight or more of an entire solvent, and the irk composition further comprises a phosphoric acid ester neutralized material as well as an additional solvent selected from among an alcohol, a polyhydric alcohol and a glycol ether each having an aromatic ring in an amount, based on an entire weight of the ink composition, of from 0.1 to 15% by weight.

The ink composition for an oil-based ballpoint pen according to this embodiment (c) comprises a phosphoric acid ester nuetralized material. According to the present invention, a coloring material, a resin and other ink components than the above-described components are contained in the ink composition; however, due to these components, the ink components which are agglomerated on a surface of a ball tend to cause the blobbing of writing at the start of writing. Whereas, the phosphoric acid ester exerts an effect which facilitates removal of such ink agglomerate on the surface of the ball, Owing to this effect, there is an effect of suppressing the blobbing at the start of writing.

Details of specific examples of the phosphoric acid neutralized materials or amounts thereof to be added can be same as those as described in the above-described embodiment (a).

In this embodiment (c), by using an additional solvent selected from among the alcohol, the polyhydric alcohol and the glycol ether each having an aromatic ring as an auxiliary solvent, simultaneously with the phosphoric acid ester neutralized material, in addition to the main solvent selected from among the alcohol, the polyhydric alcohol and the glycol ether each having no aromatic ring, an effect of action which enhances an effect of peeling or repelling the ink from the surface of a metallic ball is exerted and, by this effect of action, it is possible to suppress the blobbing of writing at the start of writing and enhance the effect of realizing a soft smooth feeling of writing and such effect as described above is remarkable.

As for the alcohol, polyhydric alcohol and glycol ether each having the aromatic ring to be used in this embodiment (c), those described below and the like can be mentioned.

As for the alcohols, benzyl alcohol, ethylene oxide derivatives thereof or propylene oxide derivatives, and derivatives of a mixture of EO and PO may be mentioned; as for the glycol ethers, ethylene glycol monophenyl ether, ethylene oxide derivatives thereof or propylene oxide derivatives thereof, and derivatives of a mixture of EO and PO may be mentioned and, further, propylene glycol monophenyl ether, ethylene oxide derivatives thereof or propylene oxide derivatives thereof, and derivatives of a mixture of EO and PO may be mentioned and, still further, butylene glycol monophenyl ether, ethylene oxide derivatives thereof or propylene oxide derivatives thereof, and derivatives of a mixture of EO and PO may be mentioned.

The amount of the alcohol, polyhydric alcohols and glycol ether each having an aromatic ring to be added may be, based on the irk composition, from 0.1 to 15% by weight and, preferably, from 0.5 to 10% by weight. When it is less than 0.1% by weight, an effect is diminished, while, when it is more than 15% by weight, a phenomenon occurs in which a drawn line scribbled at a high speed is broken.

According to the embodiment (c) according to the present invention, being different from a prior method, the ballpoint pen capable of being excellent in suppressing the blobbing of the written letter at the start of writing and realizing the soft smooth feeling of writing can be provided.

In this embodiment (c) of the present invention, the reason for exerting such effects as described above is in the characteristics of the ink composition, namely, the reason of obtaining the ink excellent in suppressing the blobbing of the written letter at the start of writing and the soft smooth feeling of writing is because the effect of the phosphoric acid ester neutralized material can be supported by using a small amount of the solvent having the aromatic ring in an aliphatic-based organic solvent-type ink. In other words, an effect of suppressing an irk leakage into the metallic ball can be exerted. By the effect, it is possible to provide the oil-based ink composition for the ballpoint pen which uses the main solvent as defined in the Claims, exerts a smooth feeling of writing based on the composition thereof, supplements the performance of the phosphoric acid ester neutralized material by adding a small amount of the solvent having an aromatic ring, improves the blobbing at the start of writing and is excellent in realizing the soft smooth feeling of writing.

<Other Components>

Further, in the oil-based ink composition for the ballpoint pen according to the present invention, in any of the above-described embodiments, if desired, a rust preventive, an antifungal, a surfactant, a lubricant, a wetting agent and the like, which are compatible without adversely affecting the ink, can further be compounded. In particular, a fatty acid or the like can favorably be used as the lubricant. Also, a non-volatile solvent or the like compatible with the main solvent can be compounded as an additive for preventing drying, within the range of not causing any adverse effect in view of the product properties.

<Ink Follower>

In a case of using the ink composition according to the present invention in a ballpoint pen, an ink follower is preferably imparted to a rear end of the ballpoint pen. Since the solvent used is volatile, the ink follower is provided for preventing volatilization, moisture absorption and ink leakage.

The ink follower must exhibit a low permeability and a low diffusion property to a solvent used for the ink and a base material thereof may be a non-volatile or sparingly volatile fluid body, more specifically, non-silicon-base oils and fats fundamentally incompatible with the solvent according to the present invention, particularly, the main solvent, such as polybutene and liquid paraffin, may be used, In a case in which such a substance as described above has a low viscosity, a thickener or a gelling agent may be used. Specific examples thereof include metal soaps, bentonites, fatty acid amides, hydrogenated castor oils, metal fine particles including those of titanium oxide, silica, alumina or the like, celluloses, and elastomers.

EXAMPLES

The present invention is described in greater detail below with reference to Examples; however, the present invention is not limited to these Examples.

Examples Related to Embodiment (a)

In regard to a phosphoric acid ester neutralized material to be used in the preparation of ink, a phosphoric acid ester and an amine-type compound were each dissolved in the main solvent to prepare respective 2% solutions, Then, a neutralization titration was performed by using the thus-prepared solutions, to thereby obtain a neutralization point. By using the neutralization ratio obtained by this neutralization titration, the components were mixed at a predetermined value as described below, to thereby obtain the phosphoric acid ester neutralized material.

Components used in Examples and Comparative Examples described below are as follows:

SPIRON Violet C-RH: a spirit-soluble dye in which methyl violet is a basic material;
SPIRON Yellow C-GNH: a spirit-soluble yellow dye;
Printex#35: carbon black;
HIRACK 110H: alcohol-soluble resin;
Chromophthal Blue A-3R: indathrene (pigment);
Chromophthal Violet B: dioxadine violet (pigment); and
YP90L: terpene phenol resin.

Examples 1 to 4 and Comparative Examples 1 to 4 are described below.

Example 1

| | |
|---|---|
| Carbon black #25 [produced by Mitsubishi Chemical Co., Ltd.] | 10% |
| Polyvinyl butyral BL-S [produced by Sekisui Chemical Co., Ltd.] | 5% |
| YP90L [produced by Yasuhara Chemical K.K.] | 8% |
| Polypropylene glycol (average molecular weight: 4000) | 5% |
| Phosphoric acid ester: Prisurf A208B | 1.47% |
| Amine-type compound: polyoxyethylene alkylamine (AMIET105) | 1.03% |
| 3-methoxybutanol | 5% |
| 3-methoxy, 3-methyl, 1-butanol | 64.5% |

Example 2

| | |
|---|---|
| SPIRON Violet C-RH [produced by Hodogaya Chemical Co., Ltd.] | 8% |
| SPIRON Yellow C-GNH [produced by Hodogaya Chemical Co., Ltd.] | 5% |
| Printex#35 [produced by Degussa AG] | 8% |
| Polyvinyl butyral BL-1 [produced by Sekisui Chemical Co., Ltd.] | 4% |
| HIRACK 110H [produced by Hitachi Chemical Co., Ltd.] | 12% |
| Polypropylene glycol (average molecular weight: 4000) | 3% |
| Phosphoric acid ester: Phosphanol LB-400 | 1.46% |
| Amine-type compound: polyoxyethylene oleylamine (TAMNO-5) | 1.04% |
| 3-methoxybutanol | 5% |
| 3-methoxy, 3-methyl, 1-butanol | 52.5% |

Example 3

| | |
|---|---|
| SPIRON Blue C-RH [produced by Hodogaya Chemical Co., Ltd.] | 8% |
| SPIRON Violet C-RH [produced by Hodogaya Chemical Co., Ltd.] | 4% |
| Chromophthal Blue A-3R [produced by Ciba Geigy] | 8% |
| Polyvinyl butyral BL-1 [produced by Sekisui Chemical Co., Ltd.] | 4% |
| HIRACK 110H [produced by Hitachi Chemical Co., Ltd.] | 8% |
| Polypropylene glycol (average molecular weight: 2000) | 9% |
| Phosphoric acid ester: Prisurf A208B | 1.47% |
| Amine-type compound: polyoxyethylene alkylamine (AMIET105) | 1.03% |
| 3-methoxy, 3-methyl, 1-butanol | 56.5% |

Example 4

| | |
|---|---|
| SPIRON Violet C-RH [produced by Hodogaya Chemical Co., Ltd.] | 10% |
| Chromophthal Violet B [produced by Ciba Geigy] | 5% |
| Polyvinyl butyral BL-S [produced by Sekisui Chemical Co., Ltd.] | 3% |
| HIRACK 110H [produced by Hitachi Chemical Co., Ltd.] | 12% |
| Polypropylene glycol (average molecular weight: 2000) | 9% |
| Phosphoric acid ester: Phosphanol LB-400 | 1.46% |
| Amine-type compound: polyoxyethylene oleylamine (TAMNO-5) | 1.04% |
| 3-methoxy, 3-methyl, 1-butanol | 58.5% |

Comparative Example 1

| | |
|---|---|
| Carbon black #25 [produced by Mitsubishi Chemical Co., Ltd.] | 10% |
| Polyvinyl butyral BL-S [produced by Sekisui Chemical Co., Ltd.] | 5% |
| YP90L [produced by Yasuhara Chemical K.K.] | 8% |
| Phosphoric acid ester: Prisurf A208B | 1.47% |
| Amine-type compound: polyoxyethylene alkylamine (AMIET105) | 1.03% |
| 3-methoxybutanol | 5% |
| 3-methoxy, 3-methyl, 1-butanol | 69.5% |

Comparative Example 2

| | |
|---|---|
| SPIRON Violet C-RH [produced by Hodogaya Chemical Co., Ltd.] | 8% |
| SPIRON Yellow C-GNH [produced by Hodogaya Chemical Co., Ltd.] | 5% |
| Printex#35 [produced by Degussa AG] | 8% |
| Polyvinyl butyral BL-1 [produced by Sekisui Chemical Co., Ltd.] | 4% |
| HIRACK 110H [produced by Hitachi Chemical Co., Ltd.] | 12% |
| Phosphoric acid ester: Phosphanol LB-400 | 1.46% |
| Amine-type compound: polyoxyethylene oleylamine (TAMNO-5) | 1.04% |
| 3-methoxybutanol | 5% |
| 3-methoxy, 3-methyl, 1-butanol | 55.5% |

Comparative Example 3

| | |
|---|---|
| SPIRON Blue C-RH [produced by Hodogaya Chemical Co., Ltd.] | 8% |
| SPIRON Violet C-RH [produced by Hodogaya Chemical Co., Ltd.] | 4% |
| Chromophthal Blue A-3R [produced by Ciba Geigy] | 8% |
| Polyvinyl butyral BL-1 [produced by Sekisui Chemical Co., Ltd.] | 4% |
| HIRACK 110H [produced by Hitachi Chemical Co., Ltd.] | 8% |
| Castor oil derivative | 9% |
| Phosphoric acid ester: Prisurf A208B | 1.47% |
| Amine-type compound: polyoxyethylene alkylamine (AMIETO 105) | 1.03% |
| 3-methoxy, 3-methyl, 1-butanol | 56.5% |

Comparative Example 4

| | |
|---|---|
| SPIRON Violet C-RH [produced by Hodogaya Chemical Co., Ltd.] | 10% |
| Chromophthal Violet B [produced by Ciba Geigy] | 5% |
| Polyvinyl butyral BL-S [produced by Sekisui Chemical Co., Ltd.] | 3% |
| HIRACK 110H [produced by Hitachi Chemical Co., Ltd.] | 12% |
| Polyethylene glycol (average molecular weight: 200) | 9% |
| Phosphoric acid ester: Phosphanol LB-400 | 1.46% |
| Amine-type compound: polyoxyethylene oleylamine (TAMNO-5) | 1.04% |
| 3-methoxy, 3-methyl, 1-butanol | 58.5% |

The inks obtained in Examples and Comparative Examples above were each filled in a ballpoint pen and subjected to evaluation tests as described below.

The ballpoint pen used in the test had a polypropylene tube having an inside diameter of 1.60 mm and a stainless steel tip (the ball was made of a superhard metal or a carbide metal and had a diameter of 1.0 mm). 30 minutes after the filling, the evaluations were performed under the condition of 25° C. and 65% RH as described below.

1) Evaluation of blobbing at the start of writing (sensory evaluation):

Letters of "三菱(mitsubishi)" were written and, then, the evaluation was performed based or an extent of the blobbing of the letters.

AA: almost no blobbing (the first or second line and the following lines of "三(mitsu/three)" were able to be written);

BB: slight blobbing (the second line of "三(mitsu/three)" was slightly blobbed but the following lines were able to be written without blobbing);

CC: slightly heavy blobbing (no blobbing for "菱(bishi)"); and

DD: very heavy blobbing (writing of "菱(bishi)" was not possible to the last).

2) Evaluation of blobbing at the start of writing (mechanical evaluation):

Under the condition of 25° C. and 65% RH, a pen was set at 60° and a load of 200 g was applied thereon, paper in contact with the pen was moved at a rate of 2 m/min and, then, a drawn line was evaluated. At that time, a distance of the drawn line from a start point was measured. Five pens were prepared and an average value of such measurements was used as a measured value.

AA: Measured value≦10 mm;
BB: 10 mm<Measured value≦50 mm;
CC: 50<Measured value≦100 mm; and
DD: 100<Measured value.

3) Evaluation of Blobbing at the Start of Writing for a Short Period or Time (Sensory Evaluation)

The letters "三菱(Mitsubishi)" were written and the evaluation was performed by the extent of the blobbing of the letters.

After the evaluation in 1), the same test was subsequently executed for periods of from 1 to 60 minutes (1, 3, 5, 7, 10 and 20 minutes). At that time, the test was continued without wiping the pen tip.

AA: almost no blobbing under all conditions (the first or second line and the following lines of "三(mitsu)" were able to be written);

BB: slight blobbing in a period of from 1 to 20 minutes (the second line of "三(mitsu)" was slightly blobbed but the following lines were able to be written without blobbing);

CC: comparatively heavy blobbing in a period of from 1 to 20 minutes (no blobbing for "菱(bishi)"); and DD: Very heavy blobbing in a period of from 1 to 20 minutes (writing of "菱(bishi)" was not possible until the last).

TABLE 1

| | Evaluation result | | | | | | | |
|---|---|---|---|---|---|---|---|---|
| | Example | | | | Comparative Example | | | |
| | 1 | 2 | 3 | 4 | 1 | 2 | 3 | 4 |
| 1) Evaluation | AA | AA | AA | AA | CC | CC | CC | CC |
| 2) Evaluation | AA | AA | AA | AA | DD | DD | DD | DD |
| 3) Evaluation | AA | AA | AA | AA | CC | CC | CC | CC |

As is apparent from the results shown above, it has been found that the ink compositions of Examples 1 to 4 which are within the scope of the present invention are extremely favorable concerning the blobbing at the start of writing and also in a soft smooth feeling of writing as compared with the ink compositions of Comparative Examples 1 to 4 which are out of the scope of the present invention.

Examples Related to Embodiment (b)

With regard to the phosphoric acid ester neutralized material to be used in the preparation of ink, a phosphoric acid ester and an amine-type compound were each dissolved in the main solvent to prepare respective 2% solutions. Then, a neutralization titration was performed by using the thus-prepared solutions, to thereby obtain a neutralization point. By using the neutralization ratio obtained by this neutralization titration, components were mixed at a predetermined value as described below, to thereby obtain the phosphoric acid ester neutralized material. Further, with regard to substances represented by the chemical structure (1) or (2) to be used in Examples, a 50% by weight solution thereof in a main solvent to be used was prepared and, then, the thus-prepared solution was mixed with other components and used.

Components used in Examples and Comparative Examples to be described below are as follows:
YP90L: terpene phenol resin;
SPIRON Violet C-RH: a spirit-soluble dye in which methyl violet is a basic material;
SPIRON Yellow C-GNH: a spirit-soluble yellow dye;
Printex#35: carbon black;
HIRACK 110H: alcohol-soluble resin;
SPIRON Blue C-RH: a spirit-soluble blue dye;
Chromophthal Blue A-3R: indathrene (pigment);
Chromophthal Violet B: dioxadine violet (pigment); and
POE (2) lauryl ether: polyoxyethylene 2-mol adduct lauryl ether.

Examples 11 to 14 and Comparative Examples 11 to 14 are described below.

Example 11

| | |
|---|---|
| Carbon black #25 [produced by Mitsubishi Chemical Co., Ltd.] | 10.0% |
| Polyvinyl butyral BL-S [produced by Sekisui Chemical Co., Ltd.] | 5.0% |
| YP90L [produced by Yasuhara Chemical K.K.] | 8.0% |
| Stearyl dimethylamino acetaic acid betaine (Bista-MS) [produced by Matsumoto Yushi-Seiyaku Co., Ltd.] | 2.0% |
| 3-methoxy, 3-methyl, 1-butanol | 2.0% |
| Phosphoric acid ester: Prisurf A208B | 1.47% |

-continued

| | |
|---|---|
| Amine-type compound: polyoxyethylene alkylamine (AMIET105) | 1.03% |
| 3-methoxybutanol | 5.0% |
| 3-methoxy, 3-methyl, 1-butanol | 65.5% |

Example 12

| | |
|---|---|
| SPIRON Violet C-RH [produced by Hodogaya Chemical Co., Ltd.] | 8.0% |
| SPIRON Yellow C-GNH [produced by Hodogaya Chemical Co., Ltd.] | 5.0% |
| Printex#35 [produced by Degussa AG] | 8.0% |
| Polyvinyl butyral BL-1 [produced by Sekisui Chemical Co., Ltd.] | 4.0% |
| HIRACK 110H [produced by Hitachi Chemical Co., Ltd.] | 12.0% |
| Alkyl (C14 to 18) dimethylamino acetic acid betaine (ANHITOL 86B) [produced by Kao Corporation] | 1.0% |
| 3-methoxy, 3-methyl, 1-butanol | 1.0% |
| Phospholic acid ester: phosphanal LB-400 | 1.46% |
| Amine-type compound: polyoxyethylene oleylamine (TAMNO-5) | 1.04% |
| 3-methoxybutanol | 5.0% |
| 3-methoxy, 3-methyl, 1-butanol | 53.5% |

Example 13

| | |
|---|---|
| SPIRON Blue C-RH [produced by Hodogaya Chemical Co., Ltd.] | 8.0% |
| SPIRON Violet C-RH [produced by Hodogaya Chemical Co., Ltd.] | 4.0% |
| Chromophthal Blue A-3R [produced by Ciba Geigy] | 8.0% |
| Polyvinyl butyral BL-1 [produced by Sekisui Chemical Co., Ltd.] | 4.0% |
| Lauryl dimethylamino acetic acid betaine (ADEKA AMPHOTE PB-30L [produced by Asahi Denka Co., Ltd.] | 2.5% |
| HIRACK 110H [produced by Hitachi Chemical Co., Ltd.] | 8.0% |
| Phosphoric acid ester: Prisurf A208B | 1.47% |
| Amine-type compound: polyoxyethylene alkylamine (AMIET105) | 1.03% |
| 3-methoxy, 3-methyl, 1-butanol | 63.0% |

Example 14

| | |
|---|---|
| SPIRON Violet C-RH [produced by Hodogaya Chemical Co., Ltd.] | 10.0% |
| Chromophthal Violet B [produced by Ciba Geigy] | 5.0% |
| Polyvinyl butyral BL-S [produced by Sekisui Chemical Co., Ltd.] | 3.0% |
| Myristic acid amide propyl betaine (BISTA-MAP) [produced by Matsumoto Yushi-Seiyaku Co., Ltd.] | 1.0% |
| HIRACK 110H [produced by Hitachi Chemical Co., Ltd.] | 12.0% |
| Phosphoric acid ester: Phosphanol LB-400 | 1.46% |
| Amine-type compound: polyoxyethylene oleylamine (TAMNO-5) | 1.04% |
| 3-methoxy, 3-methyl, 1-butanol | 66.5% |

Comparative Example 11

| | |
|---|---|
| Carbon black #25 [produced by Mitsubishi Chemical Co., Ltd.] | 10.0% |
| Polyvinyl butyral BL-S [produced by Sekisui Chemical Co., Ltd.] | 5.0% |
| YP90L [produced by Yasuhara Chemical K.K.] | 8.0% |
| Phosphoric acid ester: Prisurf A208B | 1.47% |
| Amine-type compound: polyoxyethylene alkylamine (AMIET105) | 1.03% |
| 3-methoxybutanol | 5.0% |
| 3-methoxy, 3-methyl, 1-butanol | 69.5% |

Comparative Example 12

| | |
|---|---|
| SPIRON Violet C-RH [produced by Hodogaya Chemical Co., Ltd.] | 8.0% |
| SPIRON Yellow C-GNH [produced by Hodogaya Chemical Co., Ltd.] | 5.0% |
| Printex#35 [produced by Degussa AG] | 8.0% |
| Polyvinyl butyral BL-1 [produced by Sekisui Chemical Co., Ltd.] | 4.0% |
| HIRACK 110H [produced by Hitachi Chemical Co., Ltd.] | 12.0% |
| 3-methoxybutanol | 5.0% |
| 3-methoxy, 3-methyl, 1-butanol | 58.0% |

Comparative Example 13

| | |
|---|---|
| SPIRON Blue C-RH [produced by Hodogaya Chemical Co., Ltd.] | 8.0% |
| SPIRON Violet C-RH [produced by Hodogaya Chemical Co., Ltd.] | 4.0% |
| Chromophthal Blue A-3R [produced by Ciba Geigy] | 8.0% |
| Polyvinyl butyral BL-1 [produced by Sekisui Chemical Co., Ltd.] | 4.0% |
| HIRACK 110H [produced by Hitachi Chemical Co., Ltd.] | 8.0% |
| POE (2) lauryl ether | 1.5% |
| Phosphoric acid ester: Prisurf A208B | 1.47% |
| Amine-type compound: polyoxyethylene alkylamine (AMIETO 105) | 1.03% |
| 3-methoxy, 3-methyl, 1-butanol | 64.0% |

Comparative Example 14

| | |
|---|---|
| SPIRON Violet C-RH [produced by Hodogaya Chemical Co., Ltd.] | 10.0% |
| Chromophthal Violet B [produced by Ciba Geigy] | 5.0% |
| Polyvinyl butyral BL-S [produced by Sekisui Chemical Co., Ltd.] | 3.0% |
| HIRACK 110H [produced by Hitachi Chemical Co., Ltd.] | 12.0% |
| Castor oil derivative | 2.5% |
| Phosphoric acid ester; Phosphanol LB-400 | 1.46% |
| Amine-type compound: polyoxyethylene oleylamine (TAMNO-5) | 1.04% |
| 3-methoxy, 3-methyl, 1-butanol | 65.0% |

The inks obtained in Examples and Comparative Examples were each filled and subjected to evaluation tests as described below.

The ballpoint pen used in the tests had a polypropylene tube having an inside diameter of 1.60 mm and a stainless steel tip (the ball was made of a superhard metal or a carbide metal and had a diameter of 1.0 mm). 30 minutes after the filling, the evaluations described below were performed under the condition of 25° C. and 65% RH.

1) Evaluation of blobbing at the start of writing (sensory evaluation): the same as in the embodiment (a).
2) Evaluation of blobbing at the start of writing (mechanical evaluation): the same as in the embodiment (a).

The ballpoint pen used in the tests to be described below had a polypropylene tube having an inside diameter of 1.60 mm and a stainless steel tip (the ball was made of a superhard metal or a carbide metal and had a diameter of 0.7 mm). 30 minutes after the filling, the evaluations to be described below were performed under the condition of 25° C. and 65% RH. In a writing performance under a high load, as the diameter of the ball is smaller, a writing pressure becomes larger and, therefore, the diameter of the ball was intentionally changed, in this test, to one smaller than those in the tests in 1) and 2).

3) Evaluation of writing under a high load

Under the condition of 25° C. and 65% RH, a pen was set at 60° and a load of 300 g was applied thereon, paper in contact with the pen was moved at a rate of 4.5 m/min in a rotating manner and, then, a drawn line was evaluated. At that time, a drawn line condition in which ink was not transferred by means of the rotation of the ball was subjected to a sensory evaluation.

TABLE 2

Evaluation result

|  | Example | | | | Comparative Example | | | |
| --- | --- | --- | --- | --- | --- | --- | --- | --- |
|  | 11 | 12 | 13 | 14 | 11 | 12 | 13 | 14 |
| 1) Evaluation | AA | AA | AA | AA | CC | DD | CC | CC |
| 2) Evaluation | AA | AA | AA | AA | DD | DD | DD | DD |
| 3) Evaluation | aa | aa | aa | aa | dd | dd | dd | dd | aa: No problem at all;
CC: A few portions in which ink was not transferred; and
dd: Many portions in which ink was not transferred in an aggravated state.

As is apparent from the results shown above, it has been found that the ink compositions of Examples 11 to 14 which are within the scope of the present invention are extremely favorable concerning blobbing at the start of writing and are excellent in a soft smooth feeling of writing and in quickly performing the transfer of the ink at the time of writing in a low speed as compared with the ink compositions of Comparative Examples 11 to 14 which are out of the scope of the present invention.

Examples Related to Embodiment (c)

In regard to the phosphoric acid ester neutralized material to be used in the preparation of ink, a phosphoric acid ester and an amine-type compound were each dissolved in the main solvent to prepare respective 2% solutions. Then, a neutralization titration was performed by using the thus-prepared solutions, to thereby obtain a neutralization point. By using a neutralization ratio obtained by this neutralization titration, the components were mixed at a predetermined value, as described below, to thereby obtain a phosphoric acid ester neutralized material.

Components used in Examples and Comparative Examples to be described below are as follows:

YP90L: terpene phenol resin;
SPIRON Violet C-RH: a spirit-soluble dye in which methyl violet is a basic material;
SPIRON Yellow C-GNH; a spirit-soluble yellow dye;
Printex#35: carbon black;
HIRACK 110H: alcohol-soluble resin;
SPIRON Blue C-RH: a spirit-soluble blue dye;
Chromophthal Blue A-3R; indathrene (pigment); and
Chromophthal Violet B: dioxadine violet (pigment).

Examples 21 to 24 and Comparative Examples 21 to 24 are described below.

Example 21

| | |
| --- | --- |
| Carbon black #25 [produced by Mitsubishi Chemical Co., Ltd.] | 10.0% |
| Polyvinyl butyral BL-S [produced by Sekisui Chemical Co., Ltd.] | 5.0% |
| YP90L [produced by Yasuhara Chemical K.K.] | 8.0% |
| Phosphoric acid ester: Prisurf A208B | 1.47% |
| Amine-type compound: polyoxyethylene alkylamine (AMIET105) | 1.03% |
| 3-methoxybutanol | 5.0% |
| Benzyl alcohol | 10.0% |
| 3-methoxy, 3-methyl, 1-butanol | 62.5% |

Example 22

| | |
| --- | --- |
| SPIRON Violet C-RH [produced by Hodogaya Chemical Co., Ltd.] | 8.0% |
| SPIRON Yellow C-GNH [produced by Hodogaya Chemical Co., Ltd.] | 5.0% |
| Printex#35 [produced by Degussa AG] | 8.0% |
| Polyvinyl butyral BL-l [produced by Sekisui Chemical Co., Ltd.] | 4.0% |
| HIRACK 110H [produced by Hitachi Chemical Co., Ltd.] | 12.0% |
| Phosphoric acid ester: Phosphanol LB-400 | 1.46% |
| Amine-type compound: polyoxyethylene oleylamine (TAMNO-5) | 1.04% |
| 3-methoxybutanol | 5.0% |
| Ethylene glycol monophenyl ether | 7.0% |
| 3-methoxy, 3-methyl, 1-butanol | 48.5% |

Example 23

| | |
| --- | --- |
| SPIRON Blue C-RH [produced by Hodogaya Chemical Co., Ltd.] | 8.0% |
| SPIRON Violet C-RH [produced by Hodogaya Chemical Co., Ltd.] | 4.0% |
| Chromophthal Blue A-3R [produced by Ciba Geigy] | 8.0% |
| Polyvinyl butyral BL-l [produced by Sekisui Chemical Co., Ltd.] | 4.0% |
| HIRACK 110H [produced by Hitachi Chemical Co., Ltd.] | 8.0% |
| Phosphoric acid ester: Prisurf A208B | 1.47% |
| Amine-type compound: polyoxyethylene alkylamine (AMIET105) | 1.03% |
| Ethylene glycol monophenyl ether | 5.0% |
| 3-methoxy, 3-methyl, 1-butanol | 60.5% |

Example 24

| | |
|---|---|
| SPIRON Violet C-RH [produced by Hodogaya Chemical Co., Ltd.] | 10.0% |
| Chromophthal Violet B [produced by Ciba Geigy] | 5.0% |
| Polyvinyl butyral BL-S [produced by Sekisui Chemical Co., Ltd.] | 3.0% |
| HIRACK 110H [produced by Hitachi Chemical Co., Ltd.] | 12.0% |
| Phosphoric acid ester: Phosphanol LB-400 | 1.46% |
| Amine-type compound: polyoxyethylene oleylamine (TAMNO-5) | 1.04% |
| Benzyl alcohol | 10.0% |
| 3-methoxy, 3-methyl, 1-butanol | 55.5% |

Comparative Example 21

| | |
|---|---|
| Carbon black #25 [produced by Mitsubishi Chemical Co., Ltd.] | 10.0% |
| Polyvinyl butyral BL-S [produced by Sekisui Chemical Co., Ltd.] | 5.0% |
| YP90L [produced by Yasuhara Chemical K.K.] | 8.0% |
| 3-methoxybutanol | 5.0% |
| Benzyl alcohol | 10.0% |
| 3-methoxy, 3-methyl, 1-butanol | 65.0% |

Comparative Example 22

| | |
|---|---|
| SPIRON Violet C-RH [produced by Hodogaya Chemical Co., Ltd.] | 8.0% |
| SPIRON Yellow C-GNH [produced by Hodogaya Chemical Co., Ltd.] | 5.0% |
| Printex#35[produced by Degussa AG] | 8.0% |
| Polyvinyl butyral BL-1 [produced by Sekisui Chemical Co., Ltd.] | 4.0% |
| HIRACK 110H [produced by Hitachi Chemical Co., Ltd.] | 12.0% |
| Phosphoric acid ester: Phosphanol LB-400 | 1.46% |
| Amine-type compound: polyoxyethylene oleylamine (TAMNO-5) | 1.04% |
| 3-methoxybutanol | 5.0% |
| 3-methoxy, 3-methyl, 1-butanol | 55.5% |

Comparative Example 23

| | |
|---|---|
| SPIRON Blue C-RH [produced by Hodogaya Chemical Co., Ltd.] | 8.0% |
| SPIRON Violet C-RH [produced by Hodogaya Chemical Co., Ltd.] | 4.0% |
| Chromophthal Blue A-3R [produced by Ciba Geigy] | 8.0% |
| Polyvinyl butyral BL-1 [produced by Sekisui Chemical Co., Ltd.] | 4.0% |
| HIRACK 110H [produced by Hitachi Chemical Co., Ltd.] | 8.0% |
| 3-methoxy, 3-methyl, 1-butanol | 68.0% |

Comparative Example 24

| | |
|---|---|
| SPIRON Violet C-RH [produced by Hodogaya Chemical Co., Ltd.] | 10.0% |
| Chromophthal Violet B [produced by Ciba Geigy] | 5.0% |
| Polyvinyl butyral BL-S [produced by Sekisui Chemical Co., Ltd.] | 3.0% |
| HIRACK 110H [produced by Hitachi Chemical Co., Ltd.] | 12.0% |
| Phosphoric acid ester: Phosphanol LB-400 | 1.46% |
| Amine-type compound: polyoxyethylene oleylamine (TAMNO-5) | 1.04% |
| Xylene | 5.0% |
| 3-methoxy, 3-methyl, 1-butanol | 63.8% |

The inks obtained in Examples and Comparative Examples were each filled and subjected to evaluation tests as described below.

The ballpoint pen used in the tests had a polypropylene tube having an inside diameter of 1.60 mm and a-stainless steel tip (the ball was made of a superhard metal or a carbide metal and had a diameter of 1.0 mm). 30 minutes after the filling, the evaluations to be described below were performed under the condition of 25° C. 65%.

1) Evaluation of blobbing at the start of writing (sensory evaluation): the same as in the embodiment (a).
2) Evaluation of lobbing at the start of writing (mechanical evaluation): the same as in the embodiment (a).
3) Evaluation of blobbing at the start of writing (mechanical evaluation):

Under the condition of 25° C. and 65% RH, a pen was set at 60° and a load of 200 g was applied thereon, paper in contact with the pen was moved at a rate of 2 m/min and, then, a drawn line was evaluated. At that time, the distance of the drawn line from a start point was measured. Five pens were prepared and an average value of such measurements was used as a measured value. Further in order to evaluate the blobbing over a long period of time, a period of leaving was set at 3 days.

TABLE 3

Evaluation result

| | Example | | | | Comparative Example | | | |
|---|---|---|---|---|---|---|---|---|
| | 21 | 22 | 23 | 24 | 21 | 22 | 23 | 24 |
| 1) Evaluation | AA | AA | AA | AA | DD | CC | DD | DD |
| 2) Evaluation | AA | AA | AA | AA | DD | CC | DD | DD |
| 3) Evaluation | BB | BB | BB | BB | DD | DD | DD | DD |

AA: Measured value ≦10 mm;
BB: 10 mm < Measured value ≦50 mm;
CC: 50 < Measured value ≦100 mm; and
DD: 100 < Measured value.

As is apparent from the results shown above, it has been found that the ink compositions of Examples 21 to 24, which are within the scope of the present invention, are extremely favorable concerning the blobbing at the start of writing and are excellent in a soft smooth feeling of writing compared with the ink compositions of Comparative Examples 21 to 24 which are out of the scope of the present invention.

INDUSTRIAL APPLICABILITY

According to the present invention, being different from a prior method, there is provided an ink composition for a ballpoint pen capable of suppressing blobbing of a written letter at the start of writing and being excellent in quickly performing a transfer of an ink at the time of writing under a high load. Further, there is also provided an ink composition for the ballpoint pen capable of suppressing the blobbing of a written letter at the start of writing for a short period of time or a long period of time and being excellent in a soft smooth feeling when writing.

The invention claimed is:

1. An oil-based ink composition for a ballpoint pen comprising at least a coloring agent, a resin, at least one solvent selected from the group consisting of propylene glycol monomethyl ether, 1,3-butanediol, 3-methoxy-1-butanol and 3-methyl-3-methoxy-1-butanol as a main solvent in an amount of 50% by weight or more based on an entire solvent, a phosphoric acid ester neutralized material in an amount of from 0.01 to 15% by weight based on an entire weight of the ink composition, and polypropylene glycol having a molecular weight of 1,000 or more in an amount of 0.01 to 10% by weight based on the entire weight of the ink composition.

2. An oil-based ink composition for a ballpoint pen comprising at least a coloring agent, a resin, at least one solvent selected from the group consisting of propylene glycol monomethyl ether, 1,3-butanediol, 3-methoxy-1-butanol and 3-methyl-3-methoxy-1-butanol as a main solvent in an amount of 50% by weight or more based on an entire solvent, a phosphoric acid ester neutralized material in an amount of from 0.01 to 15% by weight based on an entire weight of the ink composition, and a chemical substance represented by the following chemical structure (1) or (2):

(1)

wherein R represents an alkyl group having from 10 to 30 carbon atoms; or (2)

wherein R represents an alkyl group having from 10 to 30 carbon atoms, as an additive in an amount of 0.5 to 10% by weight based on the entire weight of the ink composition.

3. An oil-based ink composition for a ballpoint pen comprising at least a coloring agent, a resin, at least one solvent selected from the group consisting of propylene glycol monomethyl ether, 1,3-butanediol, 3-methoxy-1-butanol, and 3-methyl-3-methoxy-1-butanol as a main solvent in an amount of 50% by weight or more based on an entire solvent, a phosphoric acid ester neutralized material in an amount of from 0.01 to 15% by weight based on an entire weight of the ink composition, and an additional solvent selected from the group consisting of an alcohol having an aromatic ring, a polyhydric alcohol and a glycol ether in an amount of from 0.1 to 15% by weight based on an entire weight of the ink composition.

4. An oil-based ballpoint pen, containing an oil-based ink composition according to claim 1 in a refill.

5. The oil-based ballpoint pen according to claim 4, further containing an ink follower in a rear of the ink in the refill.

* * * * *